(12) United States Patent
Ippatapu

(10) Patent No.: US 10,776,029 B2
(45) Date of Patent: Sep. 15, 2020

(54) SYSTEM AND METHOD FOR DYNAMIC OPTIMAL BLOCK SIZE DEDUPLICATION

(71) Applicant: DELL PRODUCTS, LP, Round Rock, TX (US)

(72) Inventor: Venkata L R Ippatapu, Westborough, MA (US)

(73) Assignee: Dell Products, L.P., Round Rock, TX (US)

(*) Notice: Subject to any disclaimer, the term of this patent is extended or adjusted under 35 U.S.C. 154(b) by 40 days.

(21) Appl. No.: 16/230,594

(22) Filed: Dec. 21, 2018

(65) Prior Publication Data

US 2020/0201553 A1 Jun. 25, 2020

(51) Int. Cl.
- G06F 12/00 (2006.01)
- G06F 13/00 (2006.01)
- G06F 3/06 (2006.01)

(52) U.S. Cl.
CPC .......... G06F 3/0641 (2013.01); G06F 3/0619 (2013.01); G06F 3/0631 (2013.01); G06F 3/0683 (2013.01)

(58) Field of Classification Search
CPC .... G06F 3/0641; G06F 3/0619; G06F 3/0631; G06F 3/0683
USPC ........................................................ 711/100
See application file for complete search history.

(56) References Cited

U.S. PATENT DOCUMENTS

| | | |
|---|---|---|
| 5,544,347 A | 8/1996 | Yanai et al. |
| 5,742,792 A | 4/1998 | Yanai et al. |
| 6,968,369 B2 | 11/2005 | Veprinsky et al. |
| 7,054,883 B2 | 5/2006 | Meiri et al. |
| 7,996,636 B1 | 8/2011 | Prakah et al. |
| 8,082,231 B1 | 12/2011 | McDaniel et al. |
| 8,639,669 B1* | 1/2014 | Douglis ............. G06F 3/0641 707/692 |
| 8,712,963 B1* | 4/2014 | Douglis ............. G06F 11/2094 707/625 |
| 9,116,858 B1 | 8/2015 | Yokoi et al. |
| 9,436,723 B2 | 9/2016 | Lumb |
| 9,558,200 B2 | 1/2017 | Chamness |
| 9,665,305 B1 | 5/2017 | Natanzon et al. |
| 9,891,860 B1 | 2/2018 | Delgado et al. |
| 10,037,336 B1 | 7/2018 | Hu et al. |
| 10,127,235 B2 | 11/2018 | Rao et al. |
| 10,572,172 B2 | 2/2020 | Ippatapu |
| 2007/0085716 A1 | 4/2007 | Bar-Yossef et al. |
| 2008/0307120 A1 | 12/2008 | Ogawa et al. |
| 2009/0307251 A1* | 12/2009 | Heller ............. G06F 16/217 |
| 2013/0212074 A1 | 8/2013 | Romanski et al. |

(Continued)

OTHER PUBLICATIONS

P.F. Windley, et al., "Binary Search Tree," Retreived from https://en.wikipedia.org/w/index.php?title=Binary_search_tree&oldid=801134990, Sep. 17, 2017.

(Continued)

Primary Examiner — Sheng Jen Tsai
(74) Attorney, Agent, or Firm — Larson Newman, LLP

(57) ABSTRACT

A data storage system has a processor that performs deduplication operations on input/output data, and determines a space savings obtained for each one of the deduplication operations. The processor also determines a maximum space savings based on the space savings obtained for each one of the deduplication operations, and determines an optimal data block size based on the maximum space savings.

20 Claims, 9 Drawing Sheets

(56) References Cited

U.S. PATENT DOCUMENTS

| | | | |
|---|---|---|---|
| 2016/0042008 A1 | 2/2016 | Tripathy et al. | |
| 2016/0350324 A1* | 12/2016 | Wang | G06F 16/1748 |
| 2016/0366226 A1 | 12/2016 | Friedman et al. | |
| 2017/0131934 A1* | 5/2017 | Kaczmarczyk | G06F 3/0644 |
| 2017/0153829 A1 | 6/2017 | Patel et al. | |
| 2017/0199820 A1 | 7/2017 | Romanovskiy | |
| 2018/0011871 A1* | 1/2018 | Kroll | G06F 9/45558 |
| 2018/0307433 A1* | 10/2018 | Takaoka | G06F 3/0659 |
| 2018/0365159 A1* | 12/2018 | Nakata | G06F 12/10 |
| 2020/0065406 A1 | 2/2020 | Ippatapu | |

OTHER PUBLICATIONS

Venkata L. R. Ippatapu, et al., U.S. Appl. No. 15/728,758, filed Oct. 10, 2017, "Host Data Replication Using Deduplication and Binary Search Trees".

Venkata L. R. Ippatapu, et al., U.S. Appl. No. 15/879,813, filed Jan. 25, 2018, "Data Replication Using Deduplication and Synchronized Hash Tables".

\* cited by examiner

SYSTEM AND METHOD FOR DYNAMIC OPTIMAL BLOCK SIZE DEDUPLICATION

CROSS-REFERENCE TO RELATED APPLICATION

Related subject matter is contained in co-pending U.S. patent application Ser. No. 15/958,556 entitled "Multi-Granular Data Reduction for Remote Data Replication," filed on Apr. 20, 2018, and U.S. patent application Ser. No. 16/113,477 entitled "Method and Apparatus for Two Tier Data Deduplication Using Weighted Graphs," filed on Aug. 27, 2018, the disclosures of which are hereby expressly incorporated by reference in their entirety.

FIELD OF THE DISCLOSURE

The present disclosure generally relates to information handling systems, and more particularly relates to dynamic optimal block size deduplication.

BACKGROUND

Computer systems may include different resources used by one or more host processors. Resources and host processors in a computer system may be interconnected by one or more communication connections. These resources may include, for example, data storage devices such as those included in the data storage systems manufactured by Dell EMC®. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using a data storage system. For example, a host processor may perform basic system input/output (I/O) operations in connection with data requests, such as data read and write operations.

Host systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Data storage systems, hosts, and other components may be interconnected by one or more communication connections such as in a network configuration. The network may support transmissions in accordance with well-known protocols such as TCP/IP (Transmission Control Protocol/Internet Protocol), UDP (User Datagram Protocol), and the like. Networked storage systems, such as data storage arrays, may be used to maintain data on different systems in different locations. For example, in some implementations, a local or source data site may be configured in a partner relationship with a remote or destination source data site. The remote data site includes a mirror or copy of the data in the local data site. Such mirroring may be used for a variety of reasons including reducing the likelihood of data loss. Mirroring is a form of replication, in which data on the first storage device is replicated on the second storage device.

The time it takes to perform data replication depends in part on the time it takes to transmit the data being replicated between the primary data site and remote data site, and the time it takes to transmit the data being replicated depends in part on the size of the data. Thus, it may be desirable to reduce the size of the data being replicated (without losing any data) to reduce data replication times.

SUMMARY

A data storage system may perform deduplication operations on input/output data, and determine a space savings obtained for each one of the deduplication operations. The system may also determine a maximum space savings based on the space savings obtained for each one of the deduplication operations, and determine an optimal data block size based on the maximum space savings.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
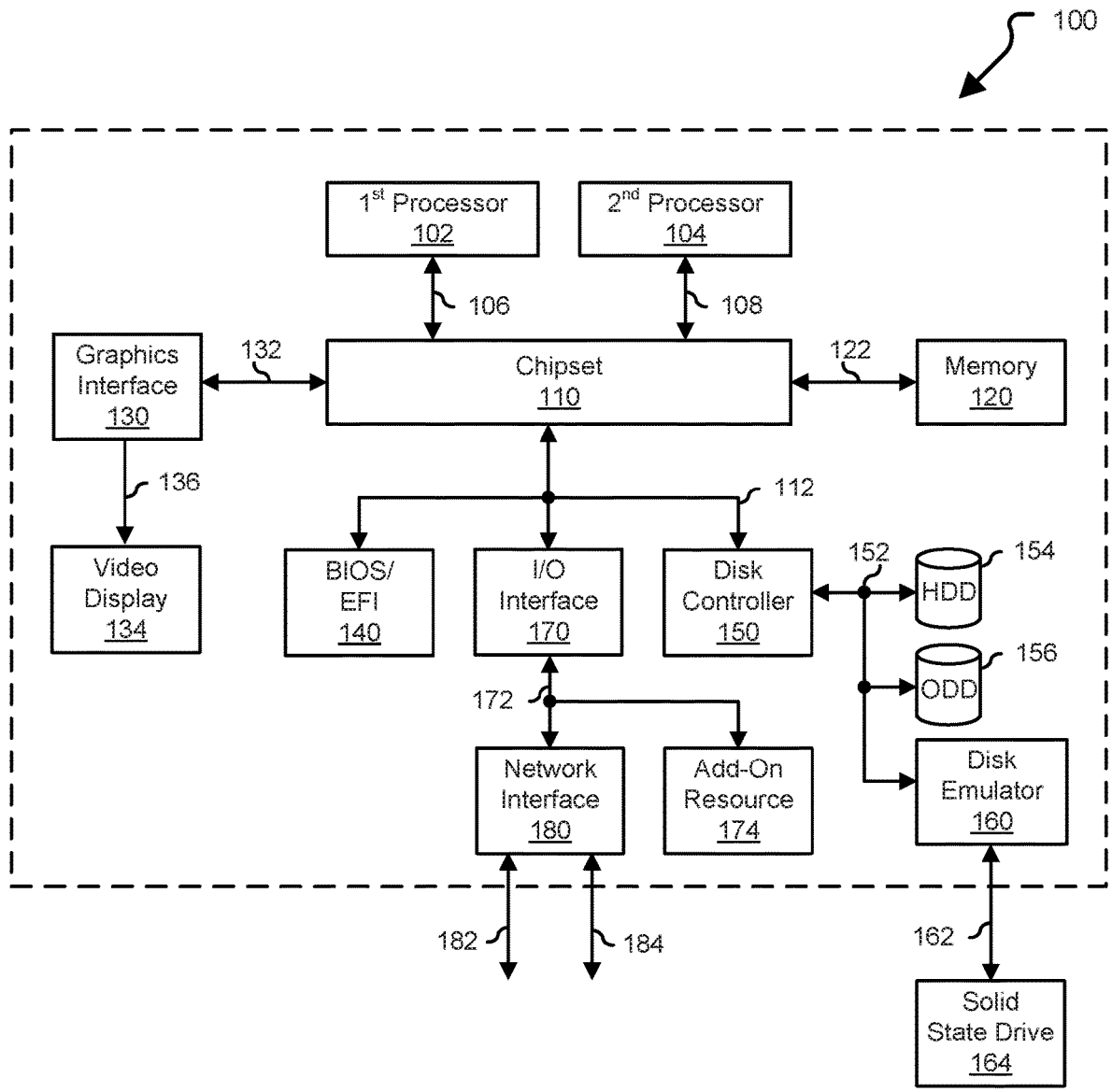
FIG. 1 is a block diagram of an information handling system according to at least one embodiment of the present disclosure.

FIG. 1 illustrates a generalized embodiment of information handling system 100. For purpose of this disclosure, information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various I/O devices, such as a keyboard, a mouse, and a video display. Information handling system 100 can also include one or more buses operable to transmit information between the various hardware components.

Information handling system 100 includes processors 102 and 104, a chipset 110, a memory 120, a graphics interface 130, include a basic input and output system/extensible firmware interface (BIOS/EFI) module 140, a disk controller 150, a disk emulator 160, an I/O interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132 and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read-only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, an SCSI interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, an SCSI interface, a USB interface, a proprietary interface, or a combination thereof. Disk emulator 160 permits a solid-state drive 164 to be connected to information handling system 100 via an external interface 162. An example of external interface 162 includes a universal serial bus (USB) interface, an Institute of Electrical and Electronics Engineers (IEEE) 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface 180 includes network channels 182 and 184 that provide interfaces to devices that are external to information handling system 100. In a particular embodiment, network channels 182 and 184 are of a different type than peripheral interface 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
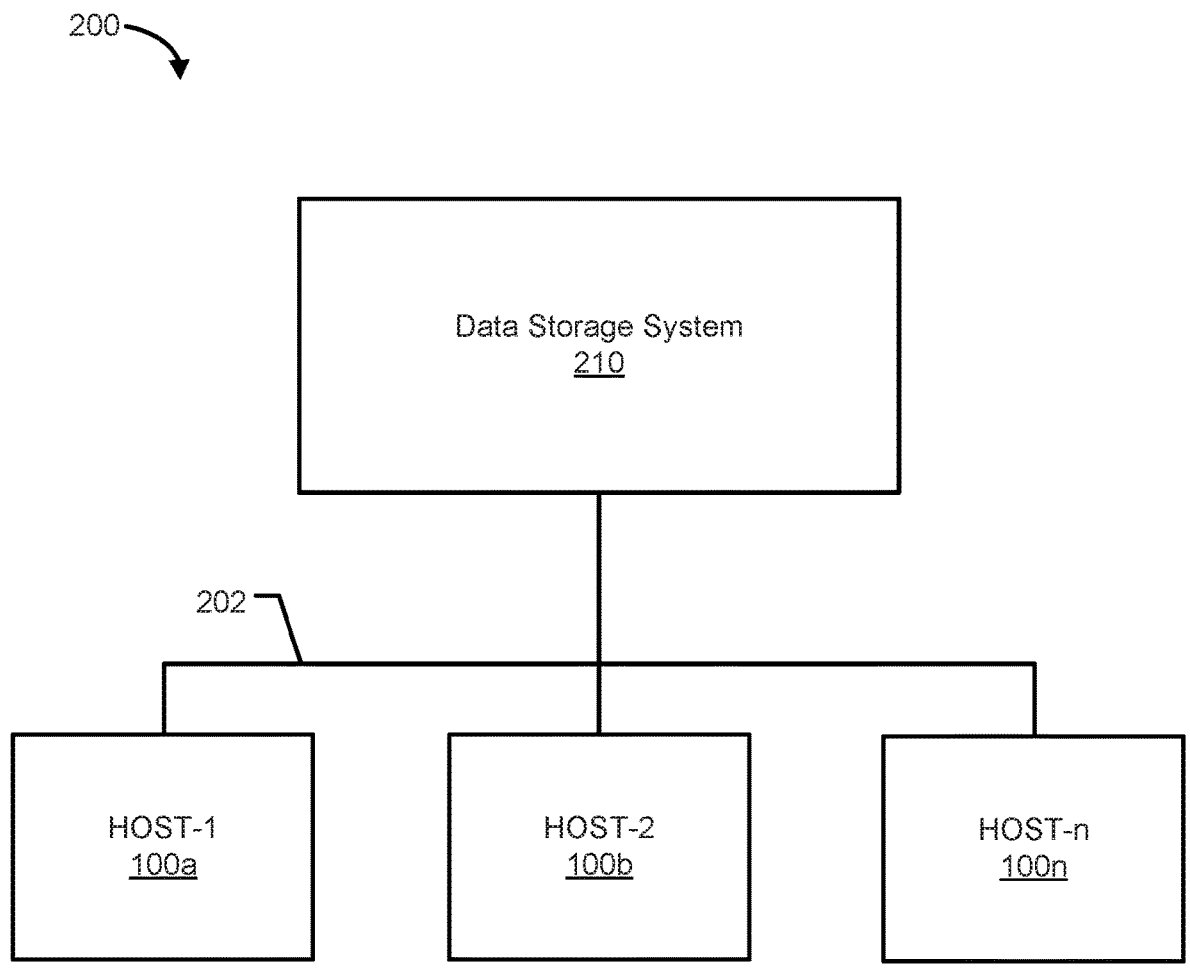
FIG. 2 is an example of an embodiment of a computer system, according to at least one embodiment of the present disclosure.

FIG. 2 shows a computer system 200 for dynamically determining the optimal data block size for data deduplication and replication. Data deduplication is a specialized technique for eliminating duplicate copies of repeating data. Deduplication may be performed on I/O data which may be divided into blocks of a determined size (512 bytes, 1024 bytes, etc.). The blocks may be ordered, for example, in an order corresponding to the order of the bits of the I/O data grouped into the blocks. Deduplication is performed on the blocks by comparing each block to the other blocks (in a defined order) in the I/O data to determine if there is a match. These comparisons may involve calculating (if one is not provided in the I/O data) and/or comparing fingerprints, for example, cyclic redundancy check (CRC) values, of each block. If a duplicate block (that is, a match) is determined for a block, the duplicate block may be identified with a reference relative to the position of the duplicate block within the I/O data.

Because of an issue of increasing demand and necessity to reduce network bandwidth and usage, a solution that reduces network bandwidth usage and at the same time replicates as much host data as possible is needed. Given that the same byte pattern may occur dozens, hundreds, or even thousands of times, the amount of data that must be stored or transferred can be greatly reduced. The number of times the same byte pattern occurs may also be referred to as a match frequency. The match frequency may depend at least in part on the size of the byte pattern also referred to as chunk size or data block size. Determining the optimal data block size is important in getting an efficient data deduplication ratio and throughput. If the data block size is too large then it reduces the exploitable redundancy in I/O data. If the data block size is too small, the I/O data becomes highly fragmented resulting in additional data overhead without any considerable data reduction.

Described herein are systems and techniques for determining the optimal data block size for data deduplication on the I/O data received from a host to a storage system, for example, as part of replicating the data at another storage system, whether inline or post-process. The dynamic approach of determining the optimal data block size to use in partitioning the I/O data maximizes the reduction of the I/O data in comparison to typical data deduplication. For example, the current disclosure has remarkable superiority in reducing data length and increasing data savings ratio. The data savings ratio may be calculated from the size of I/O data divided by the size of deduplicated data.

The computer system 200 includes a data storage system 210 connected to information handling systems also referred to as hosts 100a-100n through a communication medium 202. Other embodiments of a data storage system 210 are possible and are intended to fall within the scope of the disclosure. The data storage system 210 of FIG. 2 may contain one or more interconnected data storage systems which may be manufactured by one or more different vendors. Each of the interconnected data storage systems may be resources included in an embodiment of the computer system 200 of FIG. 2 to provide storage services to, for example, hosts 100a-100n.

In this embodiment of the computer system 200, the N hosts 100a-100n may access the data storage system 210, for example, in performing I/O operations or data requests through the communication medium 202. The processors included in the hosts 100a-100n may be any one of a variety of proprietary or commercially available single or multi-processor system, such as an Intel-based processor, or another type of commercially available processor able to support traffic in accordance with each particular embodiment and application.

The communication medium 202 may use any one or more of a variety of networks or another type of communication connections as known to those skilled in the art. The type of communication connection used may vary with certain system parameters and requirements, such as those related to bandwidth and throughput required in accordance with a rate of data requests as may be issued by the hosts 100a-100n. The communication connection may be a network connection, bus, and/or another type of data link, such as a hardwire or other connections known in the art. For example, the communication medium 202 may use the internet, an intranet, network or other wireless or other hardwired connection(s) by which the hosts 100a-100n may access and communicate with the data storage system 210, and also may communicate with data storage systems that may be included in the computer system 200.

The communication medium 202 may use a variety of different communication protocols such as small computer system interface (SCSI), enterprise systems connection (ESCON), Fibre Channel, internet small computer system interface (iSCSI), or Gigabit Ethernet (GigE), and the like. Some or all of the connections by which the hosts 100a-100n and the data storage system 210 may be connected to the communication medium 202 may pass through other communication devices, such as switching equipment, a phone line, a repeater, a multiplexer or even a satellite.

Each of the hosts 100a-100n and the data storage system 210 may all be located at the same physical site or may be in different physical locations. Each of the hosts 100a-100n may perform different types of data operations in accordance with different tasks and applications executing on the hosts 100a-100n. In the embodiment of FIG. 1, any one of the hosts 100a-100n may issue a data request to the data storage system 210 to perform a data operation. For example, an application executing on one of the hosts 100a-100n may perform a read or write operation resulting in one or more data requests to the data storage system 210.

The data storage system 210 may be a inline or post-process data deduplication system. The data storage system 210 may include one or more data storage systems. Each of the data storage systems may include a plurality of physical non-volatile storage devices arranged in n rows of disks or volumes. Each row of disks or volumes may be connected to a disk adapter or director responsible for the backend management of operations to and from a portion of the disks or volumes. A single disk adapter may be responsible for the management of a row of disks or volumes. The data storage systems may also include one or more host adapters (HAs) or directors to manage communications and data operations between one or more host systems and the global memory. In an embodiment, the HA may be a Fibre Channel Adapter or another adapter which facilitates host communication.

The data storage systems may also have a remote adapter (RA) including a processor used to facilitate communication between data storage systems, such as between two of the same or different types of data storage systems. In one embodiment, the RAs of the different data storage systems may communicate over a Gigabit Ethernet or Fibre Channel transmission channel supporting messaging traffic between data storage systems. The RA may be hardware including a processor used to facilitate communication between data storage systems, such as between two Symmetrix data storage systems. The RA may be used with Symmetrix Remote Data Facility (SRDF), a family of products (provided by Dell EMC, a division of Dell Inc.) that facilitate the data replication from one Symmetrix storage array to another through a storage area network or an IP network. SRDF logically pairs a device or a group of devices from each array and replicates data from one to the other synchronously or asynchronously. Performing remote data communications using SRDF over a TCP/IP network is described in more detail in U.S. Pat. No. 6,968,369 entitled "Remote Data Facility Over an IP Network," by Veprinsky et al., which is incorporated by reference herein. Generally, the SRDF products are one example of commercially available products that may be used to provide the functionality of remote data storage for use in an embodiment in connection with techniques herein. Data storage device communication between Symmetrix data storage systems using SRDF is described, for example, in U.S. Pat. No. 5,742,792 entitled "Remote Data Mirroring," by Yanai et al., U.S. Pat. No. 5,544,347 entitled "Data Storage System Controlled Remote Data Mirroring with Respectively Maintained Data Indices," by Yanai et al., and U.S. Pat. No. 7,054,883 entitled "Virtual Ordered Writes for Multiple Storage Devices," by Meiri et al., all of which are incorporated by reference herein.

One or more internal logical communication paths may exist between the DAs, the RAs, the HAs, and the memory. An embodiment may use one or more internal busses and/or communication modules. For example, the global memory portion may be used to facilitate data transfers and other communications between the DAs, HAs and RAs in a data storage system. In one embodiment, the DAs may perform data operations using a cache that may be included in the global memory, for example in communications with other disk adapters or directors, and other components of the data storage system. The other portion is that portion of memory that may be used in connection with other designations that may vary in accordance with each embodiment.

Data storage devices may be any suitable storage devices such as rotating disk drives, flash-based storage, and the like. The particular data storage system as described in this embodiment, or a particular device thereof, such as a rotating disk or solid-state storage device (such as a flash-based storage device), should not be construed as a limitation. Other types of commercially available data storage systems, as well as processors and hardware controlling access to these particular devices, may also be included in an embodiment.

In some embodiments, write data received at the data storage system from a host or other client may be initially written to cache memory and marked as write pending. Once written to the cache memory, the host may be notified that the write operation has completed. At a later point time, the write data may be destaged from cache to the physical storage device, such as by a disk adapter.

The HAs may be used in connection with communications between a data storage system and a host system. The RAs may be used in facilitating communications between two data storage systems. The DAs may be used in connection with facilitating communications to the associated disk drive(s) and LUN(s) residing thereon.

An embodiment of the data storage system 210 may also include the concept of an RDF group in which one or more devices on a data storage system are associated with a particular group under the control of a single RA which services the devices included therein. Rather than have a single R1 device and a single R2 device, a grouping may be defined so that a source group of devices, such as on a primary storage subsystem, have corresponding target devices of a target group, such as devices on the secondary storage subsystem. Devices in a source group may be mirrored in corresponding devices of a target group using SRDF functionality.

Figure 3:
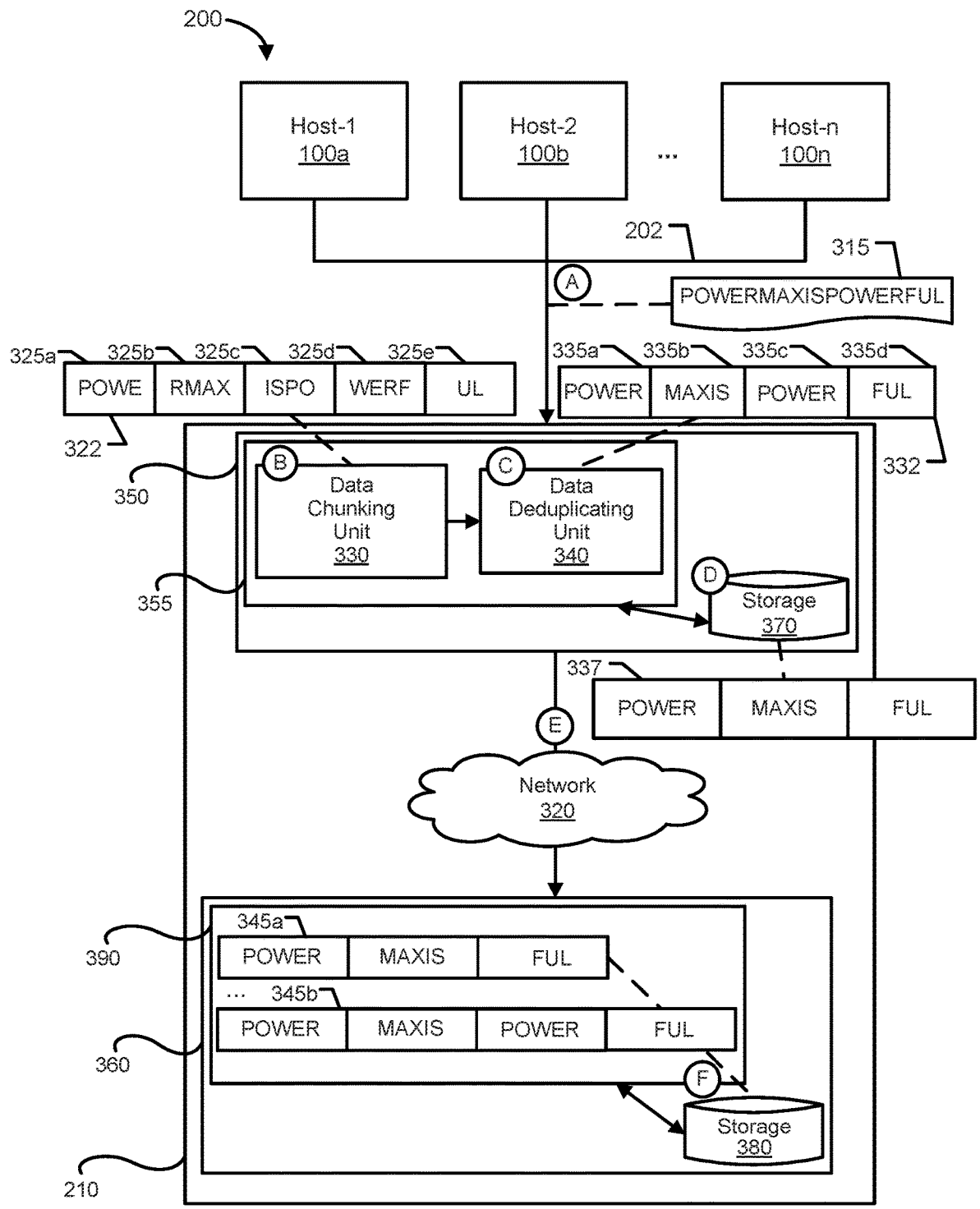
FIG. 3 is a more detailed illustration of the computer system, according to at least one embodiment of the present disclosure.

FIG. 3 shows the computer system 200 in greater detail. Computer system 200 includes a data storage system 210 and hosts 100a-100n connected through the communication medium 202. Data storage system 210 includes data storage system 350 and data storage system 360 connected through a network 320. Data storage system 350 includes a deduplication system 355 and a storage device 370. Deduplication system 355 includes a data chunking unit 330 and a data deduplicating unit 340. Data chunking unit 330 and data deduplicating unit 340 may also be implemented as a single unit or module. Data storage system 360 includes a replication system 370 and a storage device 380. Storage devices 370 and 380 may be persistent data storage devices. Storage devices 370 and 380 may include solid state disks, hard disk drives, magnetic tape libraries, optical disk drives, magneto-optical disk drives, compact disk drives, compact disk arrays, disk array controllers, and/or any computer-readable medium operable to store data.

Each of hosts 100a-100n may be a server device such as enterprise server, application server, email server, web server, content server, application server, etc. Alternatively, hosts 100-100n may be a client device such as a desktop computer, a tablet, a smartphone, etc. In some arrangements, hosts 100a-100n may include both server devices and client devices. Hosts 100a-100n may access data storage system 210, for example, in performing I/O operations through network 220. I/O operations may also be referred to as I/O requests or data requests. The processors included in hosts 100a-100n may be any one of a variety of proprietary or commercially available single or multi-processor system, such as an Intel-based processor, or another type of commercially available processor able to support traffic in accordance with each particular embodiment and application.

Network 320 may use any one or more of a variety of networks or another type of communication connections as known to those skilled in the art. The type of communication connection used may vary with certain system parameters and requirements, such as those related to bandwidth and throughput required in accordance with a rate of data requests as may be issued by hosts 100a-100n. The communication connection may be a network connection, bus, and/or another type of data link, such as a hardwire connection or other connections known in the art. For example, communication medium 202 may use an internet, an intranet, or other wireless or other hardwired connection(s) by which hosts 100a-100n may access and communicate with data storage system 210.

Data storage system 210 may be used to maintain data on a local data site and a remote data site. The local data site may also be referred to as a local data storage subsystem or the primary data storage subsystem. The remote data site may also be referred to as a remote data storage subsystem or the secondary data storage subsystem. Primary storage subsystem may be in the same physical site as hosts 100a-100n. Secondary storage subsystem may be located remotely with respect to hosts 100a-100n. For example, the distance between primary storage subsystem and secondary storage subsystem may be 200 km or more.

Data chunking unit 330 may be configured to determine the optimal chunk size in which to divide the I/O data into data blocks based on data savings. The data savings may also be referred to space savings. The data savings may translate to storage savings. With a reduction in data, there is a reduction in the space needed to store data. Chunks may also be referred to as partitions, segments, or data blocks. Dividing the I/O data may include identifying boundaries within the I/O data. A data block is data between two boundaries. It should be noted that there is an implicit boundary at a start and at an end of the I/O data. The size of each data block is referred to as the data block size or chunk size. The data savings may be calculated as equal to the number of duplicates multiplied by the data block size. The data chunking module determines the optimal data block size by calculating and comparing the data savings for different data block sizes. The data block size that resulted in a maximum data savings is the optimal data block size. Data deduplicating unit 340 partitions the I/O data based on the optimal data block size.

FIG. 3 is annotated with a series of letters A-F. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, one of hosts 100a-100n may issue a command, such as to write I/O data 315 to data storage system 210. Data storage system 210 may write I/O data 315 in its data cache prior and marked as write pending to processing. The data cache may be a reserved memory in data storage system 210. Once written to the cache memory, the host that issued the command may be notified that the write operation has completed. At a later point time, the write data may be destaged from the data cache to the physical storage device, such as by a disk adapter.

At stage B, data storage system 350 begins processing I/O data 315. Data chunking unit 330 determines the optimal block size in which to partition I/O data 315. To determine the optimal block size, data chunking module may determine three data block size thresholds: a minimum chunk threshold (MICT), a median chunk threshold (MECT) and a maximum chunk threshold (MACT). The MICT is a minimal data block size while the MACT is a maximal data block size. The MICT, the MECT, and the MACT may be determined by a user such as an administrator or may be dynamically determined by data chunking unit 330.

Several factors may be used in determining the MICT, the MECT, and the MACT. For example, the MICT, the MECT, and the MACT may be determined based on the type and/or content of the I/O data. For example, the I/O data may include email messages from an email server. The email server may contain many instances of the same one megabyte (MB) file attachment, such when an email message with the one MB attachment is resent or replied to several times. In this instance, the optimal block size may be equivalent to the size of the file attachment. In another example, the I/O data may be a collection of dissertation papers from a file server. The dissertation papers generally do not have attachments that contain instances of the same data. Thus determining the optimal data block size for the collection of dissertation papers may be different than determining the optimal data block size for the email messages with one MB attachments.

Determining the optimal data block size is important because there generally is a tradeoff between the effectiveness of deduplication against processing overhead cost. Small data block sizes may result in more duplicate data blocks and more data block metadata. The data block metadata is used to track the location and mapping of the data block. As there are more data block metadata to look up and track data blocks, processing overhead may increase. Large data block sizes may result in less duplicate data blocks and less data block metadata. As there are less data block metadata to look up and track data blocks, processing overhead may decrease. The optimal data block size may be the data block size with a desired balance between a number of duplicate data blocks and processing overhead.

Data chunking unit 330 determines the data savings for different data block sizes. Data chunking unit 330 compares each data savings to determine the maximum data savings. Data chunking unit 330 starts with determining the data savings using the MECT for the data block size. Data chunking unit 330 partitions I/O data 315 equally into data blocks or chunks based on the MECT producing partitioned data 322. Partitioned data 322 includes data blocks 325a-325e. Each data block is hashed using a cryptographic hash function such as message digest (MD) MD2, MD4, MD5, advanced encryption standard (AES), secure hash algorithm (SHA) SHA-0, SHA-1, SHA-2, SHA-3, SHA-256, etc. generating a fingerprint for each data block. A "fingerprint" as the term is used herein, is information derived from the content of a data block, that uniquely identifies the data block. The fingerprint may also be referred to as a unique identifier or a hash value. Using the fingerprint, each data block is then compared to the other data blocks to determine duplicates. For example, data chunking unit 330 compares a fingerprint of a current data block to all of the other data blocks of partitioned data 322. In particular instance, data chunking unit 330 compares a fingerprint of a data block 325a with a fingerprint of a data block 325b. The process continues until all of the data blocks are compared with every other data block. For each duplicate, a counter respective to the current partitioned data 322 is maintained and incremented. Data chunking unit 330 may also identify duplicate data blocks by setting a flag respective to each duplicate data block to one. Prior to the start of the comparison, the counter was initialized to zero. In addition, the flag may have also been initialized to zero prior to the start of the comparison. Data chunking unit 330 calculates the data savings for the MECT which is equal to the number of duplicates multiplied by the MECT.

Data chunking unit 330 continues determining the data savings for different data block sizes with the largest data block size not to exceed the MACT and a smallest data block size not to fall short of the MICT. In order words, the different data block sizes should be within the MICT and the MACT. The algorithm intelligently reduces the data chunk size by 8 bytes when the selected data chunk block size do not fall in the right end boundary for given data. Once the data savings for each of the different data block sizes have been calculated, the maximum data savings is determined. The maximum data savings is the largest data savings among the different data savings that were calculated. The data block size corresponding to the maximum data savings may be the optimal data block size. Data chunking unit 330 transmits I/O data 315 that has been partitioned using the optimal data block size producing partitioned data 332 to data deduplicating unit 240. The partitioned data 332 includes blocks 335a to 335d.

At stage C, data deduplicating unit 340 begins processing partitioned data 332 to produce deduplicated data 337. Data deduplicating unit 340 identifies duplicate data blocks in partitioned data 332. Data deduplicating unit 340 may update metadata information with a reference to a unique instance of a first occurrence of the duplicate data block. Metadata holds information respective to the deduplicated data. This process continues until all duplicate data blocks are identified and metadata information updated.

At step D, data storage system 350 stores deduplicated data 337 in storage device 370. The data storage system 350 may also store metadata information along with deduplicated data 337. At stage E, a copy of the deduplicated data 337 may be transmitted to data storage system 360 along with the metadata information via network 320. In this example, storage device 370 is in a different location than storage device 380 such that if storage device 370 becomes inoperable, any one of the hosts 100a-100n may resume operation using deduplicated data stored in storage device 380. For example, with Symmetrix Remote Data Facility (SRDF), a user may denote a first storage subsystem as a master storage device and a second storage subsystem as a slave storage device. Other incarnations of the SRDF may provide a peer to peer relationship between the local and remote storage systems. In one example, hosts 100a-100n may interact directly with data storage system 210, but any data changes made are automatically provided to a primary storage system using the SRDF. In operation, any one of hosts 100a-100n may read and write data using storage device 370, and the SRDF may handle the automatic copying and updating of data from storage device 370 to storage device 380.

At stage F, the replication system 390 allocates a buffer the size of the original I/O data (the I/O data 315). The replication system 390 may restore every duplicate and redundant data payload using the first occurrence of the duplicate or redundant data payload that is referenced in the metadata. This process continues until all the data blocks are restored. Restored data 345b from stored data 345a is shown as an example.

In some embodiments performing data replication operating in the asynchronous replication mode, an acknowledgment regarding completion of a host write from one of the hosts 100a-100n may be sent to the host from data storage system 210 once the write data has been written to a data cache. Consistent with discussion elsewhere herein, the write data is subsequently destaged from the data cache to storage device 370 in the primary storage system. Additionally, the write data may also be transferred to storage device 380 in secondary storage system where the write data is then written to a second data cache, and acknowledgment is returned from the secondary storage subsystem to data storage system 210, and subsequently the write data is destaged from the second data cache and stored in storage device 280.

Figure 4:
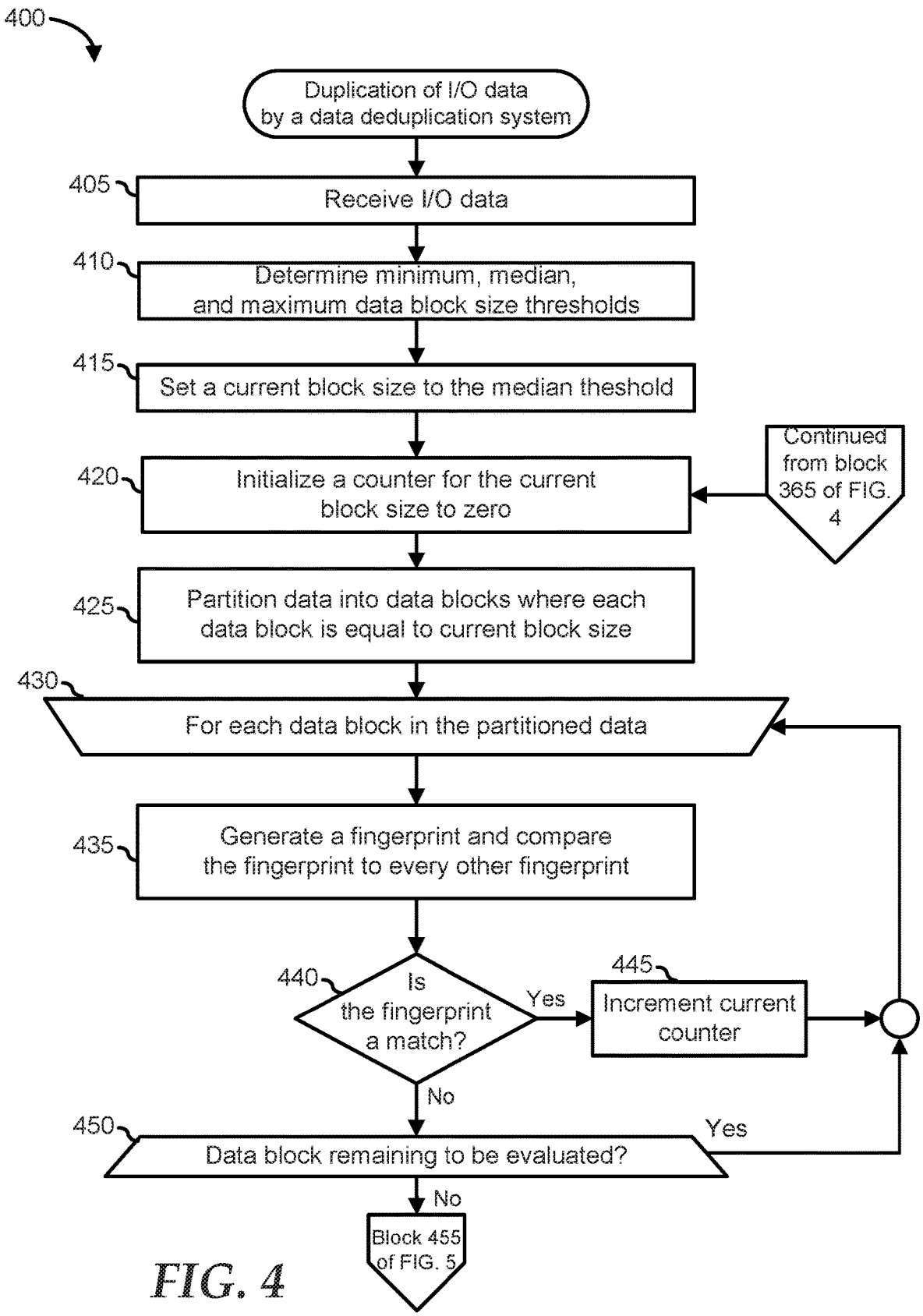
FIG. 4 is a flowchart illustrating a method of performing aspects of determining an optimal block size to partition input/output (I/O) data into fixed-length data blocks for data deduplication according to at least one embodiment of the present disclosure.

FIG. 4 shows a method 400 of performing aspects of determining the optimal block size to partition the I/O data into fixed-length data blocks for data deduplication. Each step of method 400 or portions thereof may be performed by one or more suitable components of the systems described above in relation to FIG. 3. Method 400 typically begins at block 405 where a data storage system receives I/O data. The I/O data received may be part of an I/O data request from one host of a plurality of hosts. The I/O data request may be initiated by a backup software. For example, the backup software may be configured to perform daily, weekly, or monthly backups. The data storage system that receives the I/O data may be a local data storage system. The local data storage system may be associated with a particular group of data storage systems such as at the SRDF group. The I/O data request may be received through various means such as via hypertext transfer protocol (HTTP), simple object access protocol (SOAP), representational state transfer (REST), application program interface (API), etc.

After receiving the I/O data, the data storage system determines the MICT, the MECT, and the MACT at block 410. The MICT refers to a threshold for a minimum data block size. The MACT is a threshold for a maximum data block size. The MECT refers to a median data block size. The MICT, the MECT, and the MACT may be determined by a user such as an administrator or dynamically based on the data type and/or data content. Redundancy in file content may be a factor in determining the MICT, the MECT, and the MACT. For example, if the I/O data is an email message with an attachment that has been replied to several times, it may be fair to assume that the attachments may be identical. As such the MICT, the MECT, and the MACT may be determined based on the size of the attachment.

At block 415, a current block size is set to the MECT. The MECT may be selected as a starting block size for determining the optimal block size. At block 420, a current duplicate counter respective to the current block size may be set and initialized to zero. The current duplicate counter may be a monotonic increasing counter that cannot be decremented. The current duplicate counter may be incremented for each duplicate data block, thus may correspond to the number of duplicate data blocks respective to the current data block size.

At block 425, the data storage system partitions the received I/O data into fixed-length data blocks where the block size is equal to the current data block size. For example, the received I/O data may be partitioned into 512-byte or 1024-byte data block sizes. Partitioned data may be written in a data cache or buffer while being processed. At block 430, each data block of the partitioned I/O data is traversed and processed. The data storage system may monitor the position of each data block and identify whether the current data block is the last data block in the partitioned I/O data.

At block 435, a fingerprint is generated for each data block and compared to the fingerprint of every other data block to determine duplicates. A cryptographic hash function such as MD5, SHA-1, or SHA-256 is used to generates a fingerprint. At block 440, if the fingerprint is a match or a duplicate of a fingerprint of another data block, then at block 445, the duplicate counter is incremented. At block 450, it is determined if there is a data block remaining to be evaluated. If there is a data block remaining to be evaluated, the process proceeds to block 430 and traverses to the next data block. Otherwise, if there is no remaining data block to be evaluated, the process proceeds to block 455 of FIG. 5.

Figure 5:
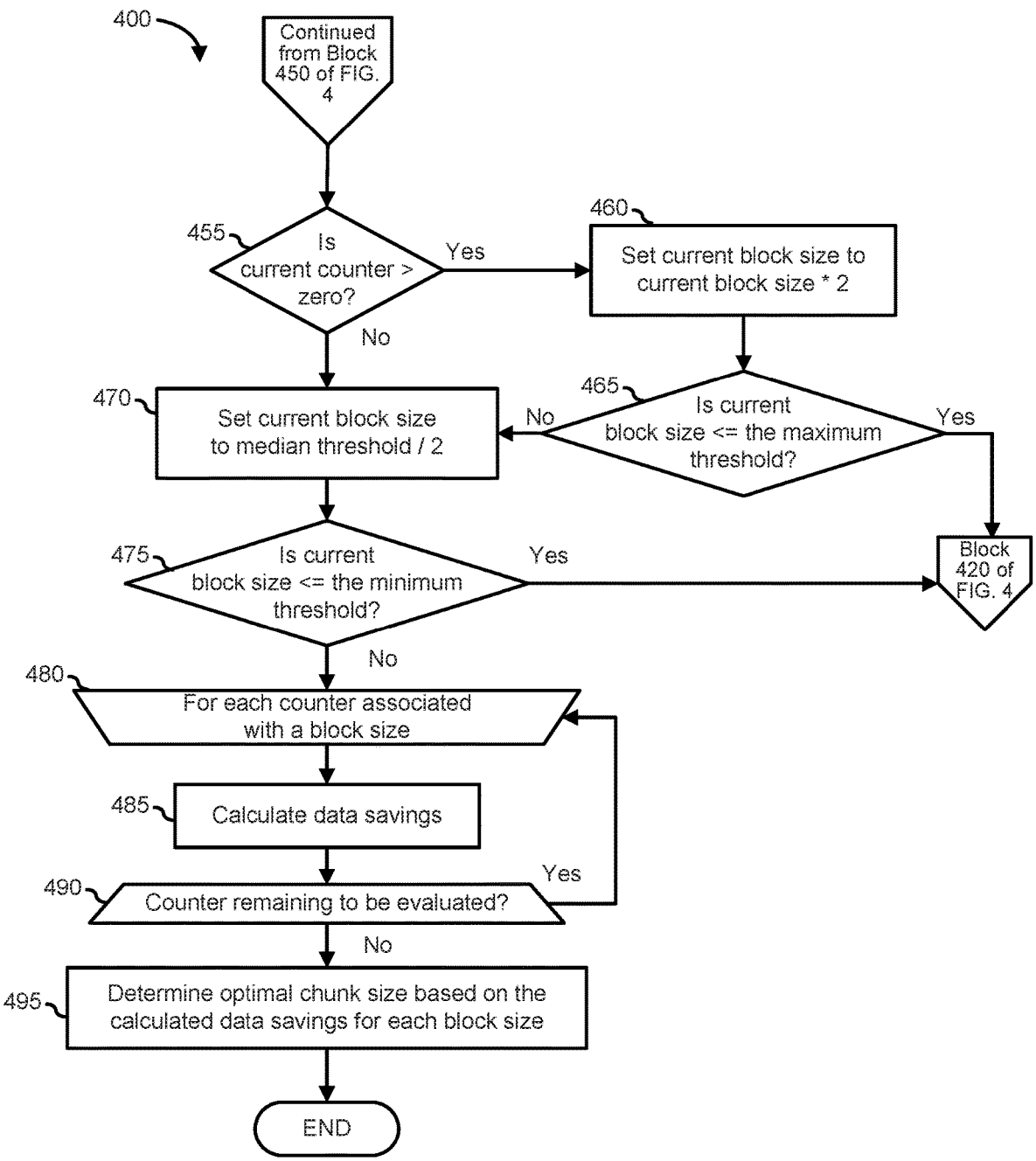
FIG. 5 is a flowchart illustrating a method of performing aspects of determining the optimal block size to partition the I/O data into fixed-length data blocks for data deduplication continued from FIG. 3 according to at least one embodiment of the present disclosure.

FIG. 5 shows a continuation of method 400 of performing aspects of determining the optimal block size to partition the I/O data into fixed-length data blocks for data deduplication continued from block 450 of FIG. 4. At block 455, if the current duplicate counter is zero, the process proceeds to block 460. At block 460, the current data block size is set to the current data block size multiplied by 2. The process then proceeds to block 465. At block 465, if the current block size is within the MACT, the process proceeds to block 420. Otherwise, the process proceeds to block 470. At block 470, the current data block size is set to the MECT divided by two.

At block 475, if the current data block size is within the MICT, the process proceeds to block 420 of FIG. 4. Otherwise, the process proceeds to block 480. At block 480, a loop begins for each duplicate counter, of a plurality of duplicate counters, that was incremented respective to each data block size. At block 485, for each duplicate counter, a data savings value is calculated for the respective block size associated with the duplicate counter. At block 490, if there is remaining counter to be evaluated, the process traverses the next counter at block 480. Otherwise, if there is no remaining counter to be evaluated the process proceeds to block 495. At block 495, the optimal block size is determined based on the calculated data savings for each block size. The optimal block size is equal to the maximum of all the data savings for each of the data block sizes.

Figure 6:
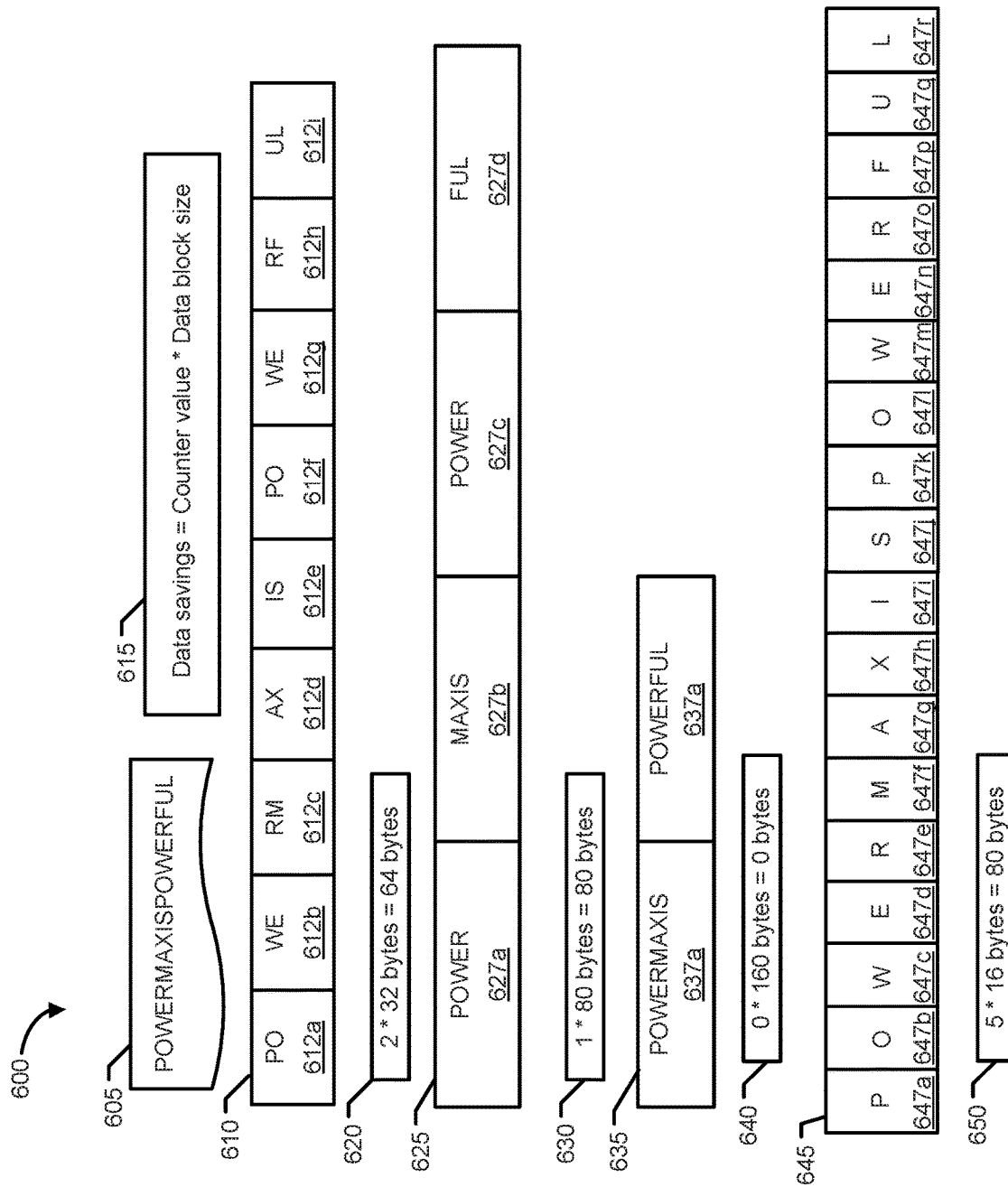
FIG. 6 is a block diagram of a method of performing a deduplication according to at least one embodiment of the present disclosure.

FIG. 6 illustrates an example 600 of determining the optimal data block size for deduplication. Other embodiments of an example of determining the optimal data block size, for example, variations of example 600, are possible and are intended to fall within the scope of the present disclosure. Each step of example 600 or portions thereof may be performed by one or more suitable components of the systems described above in relation to FIG. 3. For simplicity purposes, partitioned data 610, 625, 635, and 645 are not drawn to scale relative to the number of bytes each data block size represents.

In this example, an I/O data 605 represents I/O data to be written to data storage system 210 as illustrated in FIG. 2 and described elsewhere herein. Partitioned data 610 represents received I/O data after a first iteration of block 425 of FIG. 4. The partitioned data for each iteration of block 425 may be written in a data cache or buffer while being processed. In this example, the MECT for I/O data 605 is 40 bytes. The MICT for I/O data 605 is 16 bytes while MACT is 256 bytes with an assumption that each character in the data payload is equivalent to 16 bytes. Since the MECT value of 40 bytes do not fall in the exact data boundary, the algorithm chunks the data to 32 byte data blocks. The algorithm intelligently reduces the data chunk size by 8 bytes when the MECT does not fall in the right boundary for given data. This same logic can be applicable throughout the computation of data savings. Accordingly, partitioned data 610 has been divided into data blocks 612a-612i of 32 bytes each. At this point, a duplicate counter $C_{32}$ respective to partitioned data 610 has been initialized to zero at the block 420 of FIG. 4. A fingerprint is generated for each data block in partitioned data 610. A fingerprint for one data block may be compared with the fingerprint of every other data block at block 435 of FIG. 4. If there is a match or duplicate, the duplicate counter $C_{32}$ respective to partitioned data 610, is incremented at block 445 of FIG. 4. This process is performed for every duplicate found. After all the duplicate data blocks are found in partitioned data 610, a data savings $DS_{32}$ is calculated as shown in data savings 620. Data savings is calculated using a formula 615. Data savings $DS_{32}$ is calculated by multiplying the number of duplicates by the data block size of partitioned data 610. The number of duplicates found may be the total value of duplicate counter $C_{32}$. In this example, the value of the duplicate counter $C_{32}$ is two and the current block size is 32 bytes resulting in 64 bytes of data savings $DS_{32}$.

After determining the data savings $DS_{32}$, the next iteration is performed. The iterations may be performed while the current block size is within the MACT, that is less than or equal to the MACT. In another embodiment, the iterations may be performed while the current block size is less than or equal to the size of the I/O data. Partitioned data 625 represents I/O data 605 after a second iteration of the execution of block 425 of FIG. 4. In the second iteration, the data block size is equal to 80 bytes. Accordingly, partitioned data 625 may have been divided into data blocks 627a-627d of 80 bytes each. At this point, a duplicate counter $C_{80}$ respective to partitioned data 625 has been initialized to zero at block 420 of FIG. 3. A fingerprint is generated for each data block and compared with every other fingerprint. If there is a match or duplicate, the duplicate counter $C_{80}$ is incremented at block 445 of FIG. 3. This process is performed for every duplicate found. After all the duplicates are found, a data savings $D_{80}$ is calculated as shown in data savings 630. Data savings $D_{80}$ is equal to the number of duplicates found multiplied by the current data block size. In this example, data blocks 627a and 627c are duplicates, thus the total value of $C_{80}$, which is 1, is multiplied by the current block size, which is 80 bytes, resulting to 80 bytes of data savings. Thus, $D_{80}$ is equal to 80 bytes.

Partitioned data 635 represents I/O data 605 after a third iteration of the execution of the block 425 of FIG. 4. In the third iteration, the current data block size is equal to 160 bytes. Accordingly, partitioned data 635 is divided into data blocks 637a and 637b of 160 bytes each. At this point, a duplicate counter $C_{160}$ respective to partitioned data 635 has been initialized to zero. A fingerprint is generated for each data block in partitioned data 635. Each fingerprint is compared with every other fingerprint. For each match or duplicate, the duplicate counter $C_{160}$ is incremented. After all the duplicate data blocks are found, a data savings $D_{160}$ is calculated as shown in data savings 640. Data savings $D_{160}$ is equal to the number of duplicates found multiplied by the current block size. In this example, the total value of $C_{160}$, which is 0, may be multiplied by the current block size, which is 160 bytes, resulting to zero bytes of data savings. Thus, $D_{160}$ is equal to zero bytes.

Because there is no duplicate found in the previous iteration, the current block size is calculated as equal to the MECT divided by two at block 470 of FIG. 4. Partitioned data 645 represents I/O data 605 data after a fourth iteration of the execution of the block 425 of FIG. 4. Accordingly, partitioned data 5645 is divided into blocks of 16 bytes each. At this point, a duplicate counter $C_{16}$ respective to partitioned data 645 has been initialized to zero. A fingerprint is generated for each data block in partitioned data 645 and compared with every other fingerprint. If there is a match or duplicate, the duplicate counter $C_{16}$ may be incremented at block 445 of FIG. 4. This process is performed for every duplicate found. After all the duplicates are found, a data savings $D_{16}$ is calculated as shown in data savings 650. Data savings $D_{16}$ is equal to the number of duplicates found multiplied by the current block size. In this example, the total value of duplicate counter $C_{16}$, which is 5, multiplied by the current block size, which is 16 bytes, resulting to 80 bytes of data savings. Thus, data savings $D_{16}$ is equal to 80 bytes.

Because the current data block size is equal to the MICT, the maximum data savings is calculated. As used herein, the maximum data savings $D_{max}$ is calculated. In this example, $D_{max}$=maximum ($D_{32}$, $D_{80}$, $D_{160}$, and $D_{16}$), where $D_{max}$ is equal to 80 bytes. Because $D_{80}$ and $D_{16}$ each have data savings of 80 bytes, the largest possible data block size is selected. The largest possible data block size is selected because the number of data blocks will decrease thus decreasing the number of metadata headers which translates to a reduction in processing time which increases efficiency or performance. Because the data block size in data savings $D_{80}$ is 80 bytes which is larger than the data block size of data savings $D_{16}$ which is 16 bytes, the data block size 80 bytes is selected as the optimal data block size.

Figure 7A:
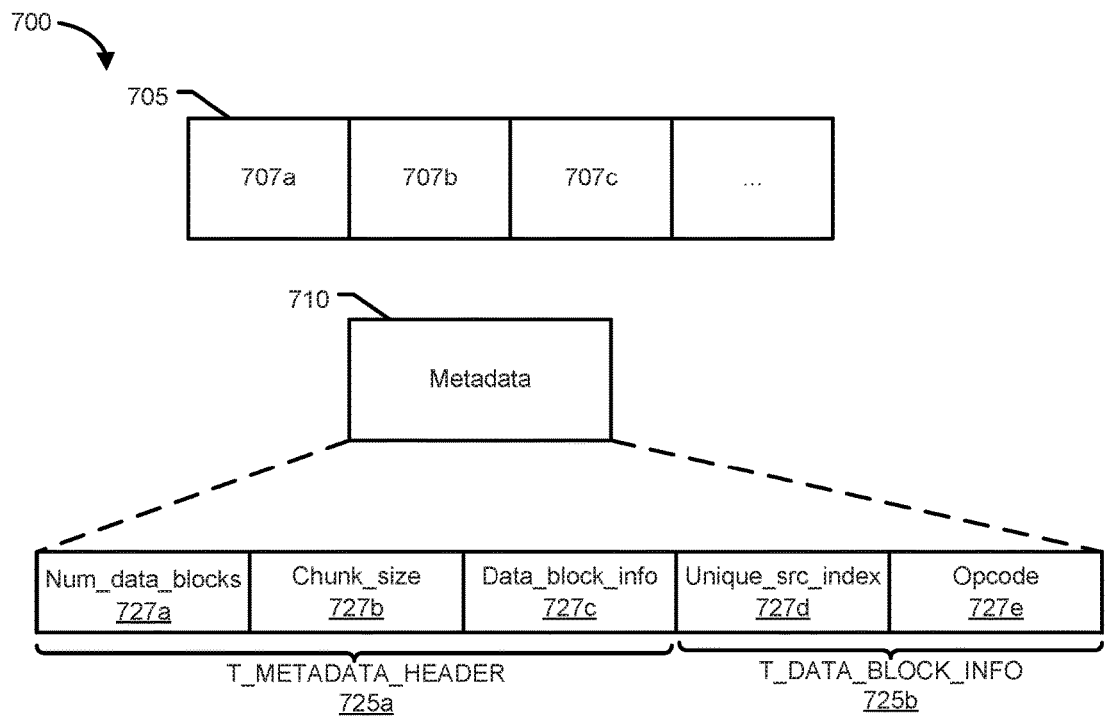
FIG. 7A shows an example of data blocks and associated data structures that may be used according to at least one embodiment of the present disclosure.

FIG. 7A shows an example 700 and associated data structures that may be used in determining the optimal data block size for data deduplication. As mentioned earlier, the I/O data may be divided into one or more data blocks. Associated with each block of I/O data may be metadata used to generally describe that particular data block. Metadata may include information such as the number of data blocks the I/O data has been divided into, the size of the data blocks, a reference to a duplicate data block, the reference may be relative to the position of the duplicate data block within the I/O data, and a flag to indicate whether the data block has been deduplicated or not.

Partitioned data 705 is an I/O data of a host-requested I/O operation that has been divided into the optimal size data blocks. Each data block has a respective block-level metadata. In the example 700, data block 707a denotes a first data block and its respective block-level metadata (not shown), data block 707b denotes a second data block and its associated block-level metadata (not shown), and data block 707c denotes a third data block and its associated block-level metadata.

Data block 710 illustrates data block 707b in greater detail. Metadata 710 includes T_METADATA_HEADER (metadata header 725a) and T_DATA_BLOCK_INFO (data block information 725b). Metadata 710 is independent of partitioned data 705 and transmitted along with payload of partitioned data 705. Metadata header 725a may include fields num_data_blocks 727a, chunk_size 727b, and data_block_info 727c. Data block information 725b may include fields unique_src_index 727d, and opcode 727e. There may be a unique_src_index and opcode for each data block in the partitioned data. Num_data_blocks 727a may be an integer equal to the number of data blocks the I/O data has been divided into. Chunk_size 727b may be an integer equal to the optimal data block size. If the value of num_datablocks 727a is greater than zero, then data_block_info 727c may be equal to malloc(number of data blocks*sizeof(T_DATA_BLOCK_INFO). If the value of num_datablocks 727a is equal to zero, then data block info 727c may be equal to malloc(sizeof(T_DATA_BLOCK_INFO). The function malloc returns a pointer to the allocated space for the I/O data. Unique_src_index 727d may be a single byte reference value that points to a position of the first occurrence of a unique data block, which is identified by the first occurrence of a unique fingerprint.

Figure 7B:
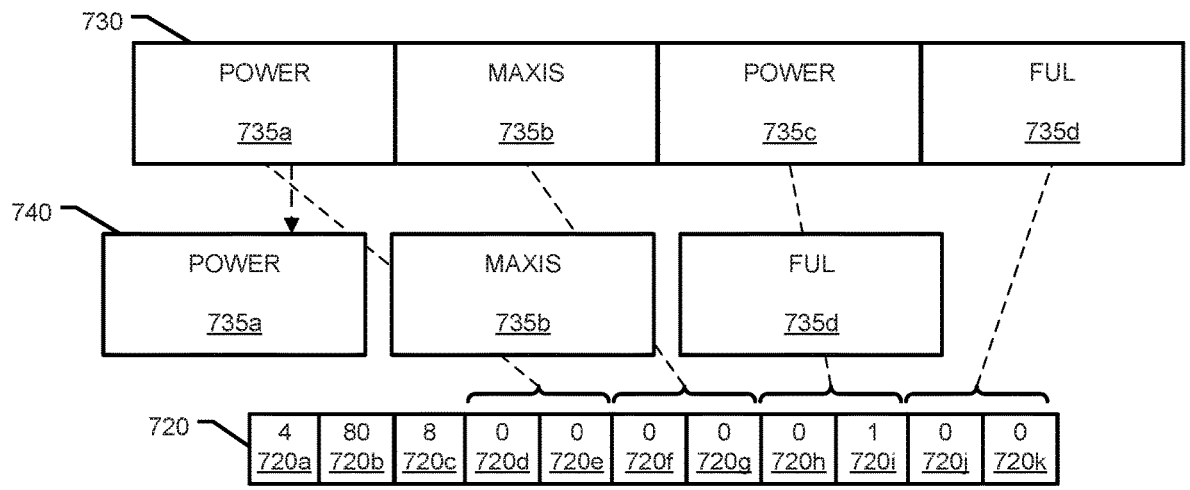
FIG. 7B shows an example of partitioned I/O data and associated data structures that may be used according to at least one embodiment of the present disclosure.

FIG. 7B shows a partitioned data 730 and associated data structures of example 700 that may be used in determining the optimal data block size for data deduplication. In this example, partitioned data 730 is divided into data blocks 735a-735d. The payload "POWER" in data block 735c is a duplicate of the payload "POWER" in data block 735a. If a data block is a duplicate of another data block, metadata information may be updated with a reference. The reference is a pointer to the position of the first occurrence of the duplicate block within the partitioned data. It should be appreciated that the data payload in the first data block in the partitioned data is always unique in the sense the first data block includes the first occurrence of a data payload. Prior to deduplication, the metadata fields unique source index and operation code of each data block may all be initialized to zero.

Deduplicated data 740 is partitioned data 730 after it has been deduplicated. During deduplication, the payload in data block 735a is retained because data block 735a is the first data block of partitioned data 730. The data payload "MAXIS" in data block 735b is compared with the payload "POWER" in data block 735a. Because "MAXIS" is not a duplicate of "POWER", the process proceeds to next data block 735c. Since payload "POWER" in data block 735c is a duplicate of "POWER" in data block 735a, metadata respective to data block 735c may be updated.

Metadata 720 includes fields 720a to 720k and shows metadata information for deduplicated data 740. Fields 720a to 720c indicates the T_METADATA_HEADER. Fields 720d to 720k indicates the T_DATA_BLOCK_INFO. For example, field 720a show the number of data blocks of the original I/O data which is 4. Field 720b shows the optimal data block size which is 80 bytes. Since the number of data blocks is greater than zero, the field 720c is calculated as malloc(number of data blocks*size of(T_DATA_BLOCK_INFO), which is malloc(4*2) or 8. Because there are two fields (unique_src_index and opcode) in T_DATA_BLOCK_INFO, the size of T_DATA_BLOCK_INFO is set to 2. The malloc should return a pointer for an allocated space for the I/O data. In this example field 720a is equivalent to num_data_blocks, field 720b is equivalent to chunk size, and 720c is equivalent to data_block_info. The T_DATA_BLOCK_INFO includes the unique_src_index and the opcode for each data block of the partitioned data 730. As mentioned earlier, if the value of the opcode is one, then the data block is deduplicated. If the value of the opcode is zero, then the data block is not deduplicated. Fields 720d and 720e is the unique_src_index and opcode respectively for data block 735a. Fields 720d and 720e indicates that the first data block 735a is unique and not deduplicated. Fields 720f and 720g is the unique_src_index and opcode respectively for data block 735b. Fields 720f and 720g indicates that the second data block 735b is unique and not deduplicated. Fields 720h and 720i is the unique_src_index and opcode respectively for data block 735c. Fields 720h and 720i indicates that the third data block 735c is deduplicated and the unique_src_index is 0 which means that the duplicate block is the first data block 735a. Fields 720j and 720k is the unique_src_index and opcode respectively for data block 735d. Fields 720j and 720k indicate that the fourth data block 735d is unique and not deduplicated.

Figure 8:
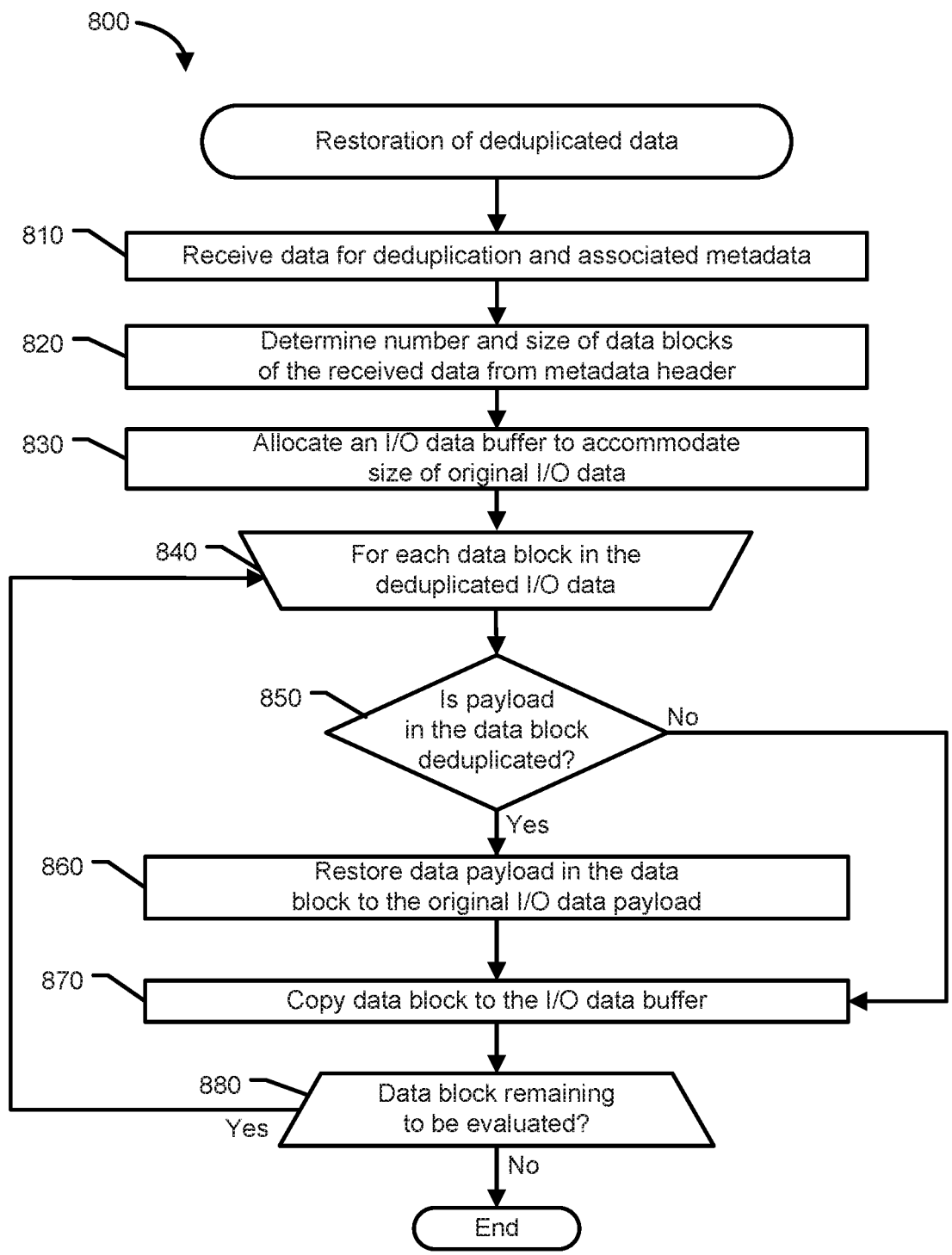
FIG. 8 is a flowchart illustrating an example of a method of restoring original I/O data from deduplicated I/O data according to at least one embodiment of the present disclosure.

FIG. 8 shows a method 800 for the restoration of deduplicated data by a data storage system. The method 700 may be performed by the data storage system described in FIG. 3. At block 810, the data storage system receives the deduplicated data and associated metadata from a local or remote storage subsystem. The associated metadata may include a metadata header and data block information.

At block 820, the data storage system determines a number and size of data blocks from the metadata header. The data block size may be the optimal data block size used to partition the original I/O data. The number of data blocks is the number of partitions that resulted from the partition. The data block size may be determined from the field chunk_size of the metadata. The number of data blocks may be determined from the field num_data_blocks of the metadata. The data storage system calculates the original size of the I/O data by multiplying the number of data blocks by the data block size.

At block 830, after determining the original size of the I/O data, the data storage system allocates an I/O data buffer large enough to accommodate the size of the original I/O data. At block 840, the data storage system traverses the deduplicated data to evaluate and restore the data payload in the deduplicated data block to the original payload data. The data block that is currently being evaluated is herein referred to as the current data block. At block 850, the data storage system determines whether the data payload of the data block has been deduplicated. Determining whether the current data block has been deduplicated may include inspecting the field opcode of the metadata corresponding to the current data block. A value one of the opcode may indicate that the data payload of the current data block has been deduplicated. A value of zero of the opcode may indicate that data payload of the current data block has not been deduplicated, that is unique. If it is determined that the data payload of the current data block has been deduplicated then processing proceeds to a block 860. Otherwise, processing proceeds to a block 870.

At block 870, the data storage system determines the unique source index. The unique source index references the position of the unique data payload and copies the data payload to the current data block. The current data block with the restored data payload is copied to the I/O data buffer. In some embodiments, data blocks with unique data payloads are arranged in some particular order before any data blocks with duplicate data.

At a block 880, the data storage system determines if there is another data block remaining to be evaluated. If there is another data block remaining to be evaluated, the process proceeds with the next data block in block 840. Otherwise, the process may end. After completion of the method 800, the original I/O data may now be restored in the I/O buffer.

Figure 9:
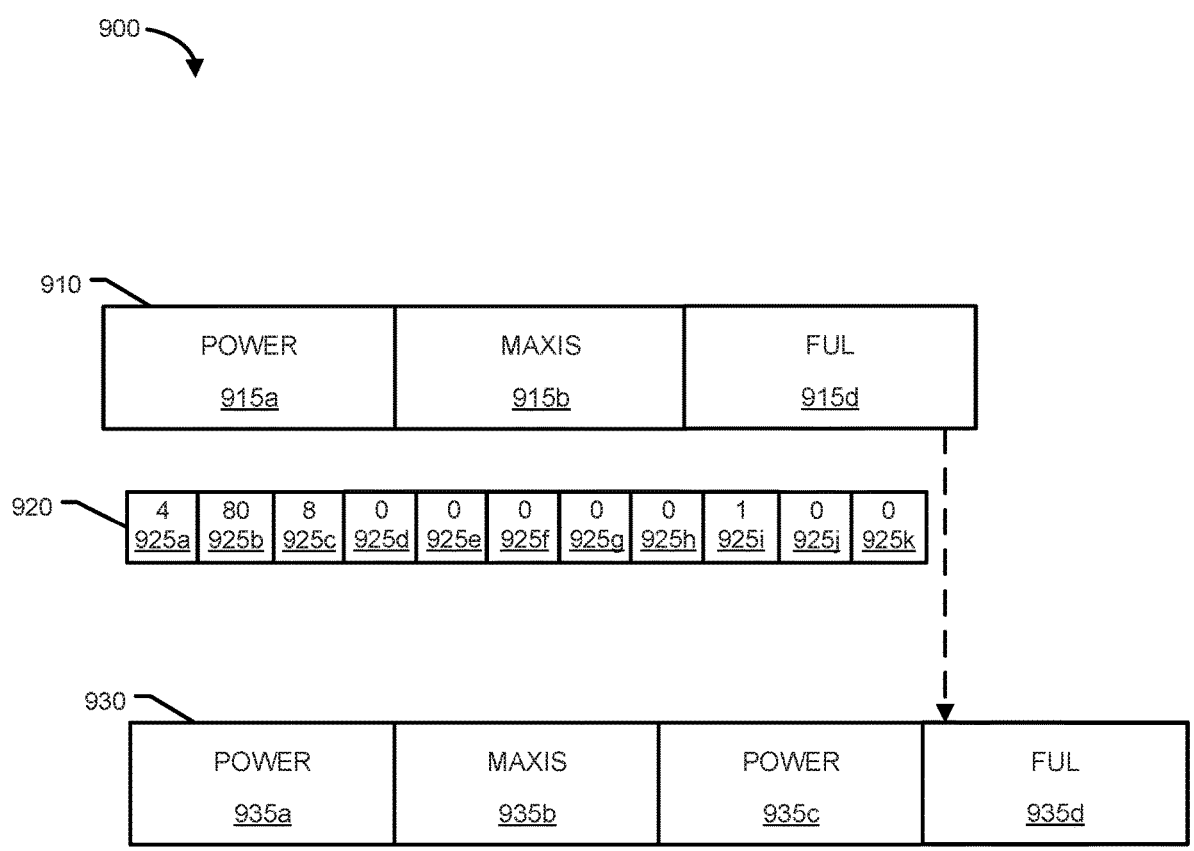
FIG. 9 shows an example data restoration performed on deduplicated I/O data according to at least one embodiment of the present disclosure.

FIG. 9 shows an example 900 of data restoration performed according to the method 800 of FIG. 8 on a deduplicated data 910. The deduplicated data 910 may have been generated after the I/O data was deduplicated according to method 400 of FIGS. 4 and 5. The deduplicated data 910 includes data blocks 915a, 915b, 915c, and 915d. A metadata 920 associated with data block 915c is shown. The metadata 920 includes fields 925a to 925k. In this example fields 925d to 925k may have stored in a different section of the memory as indicated by the dashed line. The data storage system traverses through each data block of the deduplicated data 910 to determine if the data block is deduplicated. For example, because data block 915a is the first data block in the deduplicated data 910 and is not deduplicated, as shown in fields 925d and 925e, the data storage system copies the data payload "POWER" to data block 935a of restored data 930 in the buffer. The data storage system determines if data block 915a is deduplicated. Because data block 915b is not deduplicated, as shown in fields 925f and 925g, the data storage system copies the data payload "MAXIS" to the data block 935b of restored data 930 in the buffer. At this point, the data storage system determines whether data block 915c is deduplicated. The data storage system reads the opcode if the opcode is equal to one then the data block 915c is deduplicated. Otherwise, the data block 915c is not deduplicated and proceeds to copy the data payload to the buffer. In this example, opcode 925i has a value of one which indicates that data block 915c is deduplicated. The unique source index is now read to determine the location of the first occurrence of the unique data payload in the original I/O data. In this example, the value of the unique_src_index 925h is zero, referencing the first data block or data block 915a in deduplicated data 910. The data payload "POWER" in data block 935a is copied to data block 935c as shown in restored data 930. Restored data 930 includes data blocks 935a-935d. The data storage system proceeds to determine if data block 915d is deduplicated. Because data block 915d is not deduplicated, as shown in fields 925j and 925k, its data payload "FUL" is copied data block 935d of restored data 930.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method to improve efficiency of a data storage system by determining an optimal data block size, the method comprising:

determining a minimum data block size threshold, a median data block size threshold, and a maximum data block size threshold;

partitioning, by a hardware processor, input/output data into a first plurality of data blocks of a first data block size to produce first partitioned input/output data, wherein the first data block size is equal to the median data block size threshold;

deduplicating the first partitioned input/output data to produce first deduplicated input/output data wherein the deduplicating the first partitioned input/output data includes determining whether a first data block is a duplicate data block of one of the data blocks of the first partitioned input/output data;

in response to determining that the first data block is the duplicate data block, incrementing a first value of a first duplicate counter, wherein a first total value of the first duplicate counter is equal to a number of duplicate data blocks in the first partitioned input/output data;

if the first total value of the first duplicate counter is greater than zero, then determining a second data block size wherein the second data block size is equal to the first data block size multiplied by two and partitioning the input/output data into a plurality of second data blocks of the second data block size to produce second partitioned input/output data, wherein the second data block size is within the maximum data block size threshold;

if the first total value of the first duplicate counter is equal to zero, then partitioning the input/output data into a third plurality of data blocks of a third data block size to produce a third partitioned input/output data, wherein the third data block size is equal to the first data block size divided by two, wherein the third data block size is within the minimum data block size threshold; and determining a first data savings of the first deduplicated input/output data, including multiplying the first data block size by the first total value of the first duplicate counter.

2. The method of claim 1, wherein the determining whether the first data block is the duplicate data block of one of the data blocks includes determining whether a first fingerprint of the first data block matches a second fingerprint of the one of the data blocks.

3. The method of claim 1, the determining that the first total value of the first duplicate counter is greater than zero, further comprising:

deduplicating the second partitioned input/output data to produce second deduplicated input/output data wherein the deduplicating the second partitioned input/output data to produce the second deduplicated input/output data includes determining whether a first particular data block of the second partitioned input/output data is the duplicate data block of one of the second data blocks of the second partitioned input/output data;

in response to determining that the first particular data block of the second partitioned input/output data is the duplicate data block of one of the second data blocks of the second partitioned input/output data, incrementing a second value of a second duplicate counter, wherein a second total value of the second duplicate counter is equal to a second number of duplicate data blocks in the second partitioned input/output data; and determining a second data savings of the second deduplicated input/output data, wherein determining the second data savings includes multiplying the second data block size by the second total value of the second duplicate counter.

4. The method of claim 3, wherein the second data block size is within the maximum data block size threshold.

5. The method of claim 3, further comprising:
determining a maximum data savings, wherein determining the maximum data savings includes comparing the first data savings and the second data savings, and wherein the maximum data savings is greater of the first data savings and the second data savings.

6. The method of claim 1 the determining that the first total value of the first duplicate counter is greater than zero, further comprising:

deduplicating the input/output data to produce a third deduplicated input/output data wherein the deduplicating the input/output data includes determining whether a first particular data block of the third partitioned input/output data is the duplicate data block of one of the third plurality of data blocks of the third partitioned input/output data;

in response to determining that the first particular data block of the third partitioned input/output data is the duplicate data block, incrementing a value of a third duplicate counter, wherein a third total value of the third duplicate counter is equal to a third number of duplicate data blocks in the third partitioned input/output data; and determining a third data savings of the third deduplicated input/output data, wherein determining the third data savings includes multiplying the third data block size with the third total value of the third duplicate counter.

7. The method of claim 1, wherein a smallest data block size is within the minimum data block size threshold.

8. A method of improving efficiency of a data storage system, the method comprising:

a minimum data block size threshold, a median data block size threshold, and a maximum data block size threshold;

performing, by a hardware processor, a plurality of deduplication operations on input/output data, wherein a first deduplication operation of the deduplication operation includes:

partitioning input/output data into a first plurality of data blocks of a first data block size to produce first partitioned input/output data, wherein the first data block size is equal to the median data block size threshold;

if a first data block is a duplicate data block of one of the data blocks of the first partitioned input/output data, then incrementing a value of a first duplicate counter;

if the value of the first duplicate counter is greater than zero, then determining a second data block size that is equal to the first data block size multiplied by two and partitioning the input/output data into a plurality of second data blocks of the second data block size, wherein the second data block size is within the maximum data block size threshold;

if the value of the first duplicate counter is equal to zero, then partitioning the input/output data into a third plurality of data blocks of a third data block size that is equal to the first data block size divided by to and partitioning the input/output data into a plurality of third data blocks of the third data block size, wherein the third data block size is within the minimum data block size threshold;

determining a space savings obtained for each one of the deduplication operations on the input/output data;

determining a maximum space savings based on the space savings obtained for each one of the deduplication operations on the input/output data; and determining an optimal data block size based on the maximum space savings.

9. The method of claim 8, further comprising:
deduplicating the input/output data based on the optimal data block size.

10. The method of claim 8, wherein data block sizes of the deduplication operations are within the minimum data block size threshold and the maximum data block size threshold.

11. The method of claim 8, wherein a largest data block size is within the maximum data block size threshold.

12. The method of claim 8, further comprising:
updating a metadata information with a reference to a first occurrence of the duplicate data block.

13. The method of claim 12, further comprising:
restoring deduplicated input/output data based on the optimal data block size, wherein the restoring the deduplicated input/output data is based on the first occurrence of the duplicate data block.

14. A data storage system configured to maintain data in a persistent storage subsystem, the data storage system comprising:
 a processor; and
 a memory having code stored thereon that, when executed by the processor, performs a method including:
  determining a minimum data block size threshold, a median data block size threshold, and a maximum data block size threshold;
 performing a plurality of deduplication operations on an input/output data, wherein a first deduplication operation of the deduplication operation includes:
  partitioning, by the processor, input/output data into a first plurality of data blocks of a first data block size to produce first partitioned input/output data, wherein the first data block size is equal to the median data block size threshold;
  if a first data block is a duplicate data block of one of the data blocks of the first partitioned input/output data, then incrementing a value of a first duplicate counter;
  if the value of the first duplicate counter is greater than zero, then determining a second data block size that is equal to the first data block size multiplied by two and partitioning the input/output data into a plurality of second data blocks of the second data block size, wherein the second data block size is within the maximum data block size threshold;
  if the value of the first duplicate counter is equal to zero, then partitioning the input/output data into a third plurality of data blocks of a third data block size that is equal to the first data block size divided by to and partitioning the input/output data into a plurality of third data blocks of the third data block size, wherein the third data block size is within the minimum data block size threshold;
  determining a space savings obtained for each one of the deduplication operations on the input/output data;
  determining a maximum space savings based on the space savings obtained for each one of the deduplication operations on the input/output data; and
  determining an optimal data block size based on the maximum space savings.

15. The data storage system of claim 14, wherein the optimal data block size is within the maximum data block size threshold and the minimum data block size threshold.

16. The data storage system of claim 14, wherein the method further includes:
 deduplicating the input/output data based on the optimal data block size to produce a deduplicated input/output data.

17. The data storage system of claim 16, wherein the method further includes:
 generating a first data structure including metadata information corresponding to the deduplicated input/output data, the first data structure having a plurality of fields, wherein a first field indicates a number of data blocks, a second field indicates the optimal data block size, a third field indicates data block information.

18. The data storage system of claim 17, wherein the method further includes:
 generating a second data structure including the data block information for the deduplicated input/output data, the second data structure having another plurality of fields wherein a first particular field indicates a source index and a second particular field indicates an operation code.

19. The data storage system of claim 18, wherein the method further includes:
 restoring the input/output data from the deduplicated input/output data based on information from the first data structure and the second data structure.

20. The data storage system of claim 19, wherein the restoring the input/output data from the deduplicated input/output data using information from the first data structure and the second data structure includes determining a size of an input/output buffer, wherein the size of the input/output buffer includes multiplying the number of data blocks with the optimal data block size.

* * * * *